(12) United States Patent
Brule et al.

(10) Patent No.: US 11,760,877 B2
(45) Date of Patent: *Sep. 19, 2023

(54) POLYAMIDE-BASED COMPOSITION, ARTICLE OBTAINED THEREFROM, AND USES THEREOF

(71) Applicant: ARKEMA FRANCE, Colombes (FR)

(72) Inventors: Benoît Brule, Beaumont-le-roger (FR); Barbara Ramfel, Barc (FR)

(73) Assignee: ARKEMA FRANCE, Colombes (FR)

( * ) Notice: Subject to any disclaimer, the term of this patent is extended or adjusted under 35 U.S.C. 154(b) by 16 days.

This patent is subject to a terminal disclaimer.

(21) Appl. No.: 15/894,857

(22) Filed: Feb. 12, 2018

(65) Prior Publication Data

US 2018/0334566 A1    Nov. 22, 2018

Related U.S. Application Data

(63) Continuation of application No. 13/386,100, filed as application No. PCT/FR2010/051377 on Jul. 1, 2010, now Pat. No. 9,890,283.

(30) Foreign Application Priority Data

Jul. 23, 2009 (FR) ..................... 0955154

(51) Int. Cl.
    *C08L 77/06*    (2006.01)
    *C08L 77/00*    (2006.01)
    *C08L 77/02*    (2006.01)

(52) U.S. Cl.
    CPC .............. *C08L 77/06* (2013.01); *C08L 77/00* (2013.01); *C08L 77/02* (2013.01); *C08L 2205/02* (2013.01); *Y10T 428/139* (2015.01); *Y10T 428/1352* (2015.01); *Y10T 428/1393* (2015.01)

(58) Field of Classification Search
    CPC .......... C08L 77/02; C08L 77/04; C08L 77/06; C08J 2377/02; C08J 2377/04; C08J 2377/06; C08J 2377/08; C08J 2377/10; C08G 69/02; C08G 69/10; C08G 69/14; C08G 69/26; B29K 2077/00; B29K 2077/10
    USPC ....... 524/407, 413, 424, 432, 437, 434, 449, 524/538; 525/413; 428/34.1, 34.7, 35.2, 428/35.7, 36.9, 36.91, 36.92, 423.5, 435, 428/458, 459, 474.4, 474.7, 476.6
    See application file for complete search history.

(56) References Cited

U.S. PATENT DOCUMENTS

| | | | |
|---|---|---|---|
| 2,510,777 A | 6/1960 | Gray | |
| 4,036,811 A | 7/1977 | Noetzel | |
| 4,822,846 A * | 4/1989 | Nomura | ............... C08L 77/00 524/538 |
| 4,837,265 A | 6/1989 | Istel | |
| 5,412,013 A * | 5/1995 | Watanabe | ............... C08K 3/16 524/424 |
| 5,741,601 A | 4/1998 | Kishida | |
| 5,895,607 A * | 4/1999 | Sugino | ............... H01B 1/24 252/511 |
| 6,294,263 B1 * | 9/2001 | Okudaira | ............... B32B 27/34 428/474.4 |
| 2003/0023008 A1 * | 1/2003 | Uchida | ............... C08L 77/00 525/432 |
| 2007/0092744 A1 | 4/2007 | Di Tella et al. | |
| 2007/0104971 A1 * | 5/2007 | Wursche | ............... B32B 27/34 428/474.4 |
| 2008/0193691 A1 | 8/2008 | Bussi et al. | |
| 2010/0004406 A1 * | 1/2010 | Sato | ............... B32B 27/34 525/432 |
| 2010/0066227 A1 | 3/2010 | Wursche et al. | |
| 2010/0233401 A1 | 9/2010 | Mitadera | |

FOREIGN PATENT DOCUMENTS

| | | | |
|---|---|---|---|
| EP | 0 272 503 A1 | | 6/1988 |
| JP | 2008133455 A | * | 6/2008 |
| JP | 2010-513054 A | | 4/2010 |
| WO | WO 2006/108721 A1 | | 10/2006 |

OTHER PUBLICATIONS

Rilsan Polyamide Resins published by Atofina Chemicals Inc. and available online at https://web.archive.org/web/20030120051210/http://www.solarplastics.com/solarplastics/client/materials_pdf/Elf_Atofina_Nylon_11-12_pro.PDF on Jan. 20 (Year: 2003).*
http://www.matweb.com/search/datasheet_print.aspx?matguid=14861cb8cb8e470eba6aaf72089bf716, accessed 2021 (Year: 2021).*
Wolfgang. Griehl, Djavid. Ruestem "Nylon 12-Preparation, Properties, and Applications" Ind. Eng. Chem., 1970, vol. 62, pp. 16-22 (Year: 1970).*
International Search Report for International Patent Application No. PCT/FR2010/051377 dated Sep. 28, 2010.
MX-Nylon High Barrier Polyamide, Mitsubishi Gas Chemical, available online at http://mx-nylon.com/pponm.html, retrieved Aug. 16, 2013.
Rilsan Polyamide Resins, Atofina Chemicals Inc., available online at https://web.archive.org/web/20030120051210/http://www.solarplastics.com/solarplastics/client/materials_pdf/Elf_Atofina_Nylon_11-12_pro.pdf.
Vestamid L Polyamide 12 Compounds, Evonik Industries, available online at http://www.vestamid.com/sites/dc/Downloadcenter/Evonik/Product/VESTAMID/en/brochures/VESTAMID%20L%20compounds%20characteristics.pdf.

* cited by examiner

*Primary Examiner* — Lee E Sanderson
(74) *Attorney, Agent, or Firm* — BUCHANAN, INGERSOLL & ROONEY PC

(57) ABSTRACT

The invention relates to a composition comprising at least one first polyamide, conforming to the formula MXD·10 or MXD·10/Z and having a melting temperature $Tf_1$, and at least one second polyamide.
Said at least second polyamide has a melting temperature $Tf_2$ such that $Tf_1-40°$ C.$\leq Tf_2 < Tf_1+20°$ C.
The invention likewise relates to an article obtained from such a composition, to a method of shaping such an article, and to the use of such a composition and of such an article.

11 Claims, No Drawings

POLYAMIDE-BASED COMPOSITION, ARTICLE OBTAINED THEREFROM, AND USES THEREOF

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention relates to a polyamide-based composition, to a process for preparing it, to a method of shaping it, and to its uses, especially in the manufacture of various articles, for instance consumer goods such as electrical, electronic or automotive equipment, medical and surgical material, packaging or else sports articles.

The invention relates more particularly to a composition comprising at least two polyamides, one of them conforming to the formula MXD·10/Z.

Description of the Related Art

Of the polyamides known to date, some are of great interest on account of their significant mechanical properties, particularly for their high flexural and tensile moduli.

These include, in particular, polyphthalamides (PPA), which are semiaromatic polyamides having a high modulus, of the order of 3 GPa. The same is true of polyamide MXD·6, a product of the condensation of MXD and adipic acid, where MXD denotes meta-xylylenediamine or a mixture of metaxylylenediamine and para-xylylene-diamine.

Although PPA and MXD·6 are highly satisfactory in terms of mechanical properties (especially high modulus), they nevertheless have two major disadvantages:
  first, in view of their high melting temperature, PPA and MXD·6 are polyamides which have a high conversion temperature (typically greater than 280° C.). In addition to consumption of energy, working at a high conversion temperature imposes limits on the introduction, into the compositions based on PPA or MXD·6, of some reinforcements and/or additives which break down at such temperatures;
  secondly, owing to their likewise high glass transition temperature (Tg) and their slow crystallization kinetics, the shaping of material based on PPA or on MXD·6 necessitates working at relatively high mold temperatures, typically of the order of 120° C. to 130° C. (30 to 40° C. above the Tg), in order to obtain maximum crystallization and hence to impart optimum dimensional stability and optimum mechanical properties on the material.

More particularly, when they are shaped by injection molding, it is necessary to use molds that use oil as their heat-transfer fluid, such molds being more restrictive in use and less widespread among molders than molds which use water as their heat-transfer fluid.

For the purpose of optimizing the crystallization of a composition based on MXD·6, the article titled "*Effect of Nucleating Additives on Crystallization of Poly(m-xylylene adipamide)*", published in the journal Polymer Engineering and Science in 2007, pages 365-373, proposes introducing nucleating agents, specifically talc and PA6.6 with a melting temperature of the order of 250° C.

The polyamide MXD·10, a product of the condensation of MXD and sebacic acid, also has good mechanical properties, and especially a high modulus.

Since MXD·10 has a melting temperature (of approximately 193° C.) which is lower than that of PPA or of MXD·6, its conversion temperature, of between 200° C. and 270° C., and more generally between 210° C. and 260° C., is lower than that of PPA and MXD·6, and this limits the consumption of energy. It is also possible to envisage compositions based on MXD·10 that comprise certain reinforcements and/or additives which break down at the conversion temperatures of PPA and MXD·6.

Moreover, the density of MXD·10 is lower than that generally observed in PPA or MXD·6. Hence the articles obtained from compositions based on MXD·10 have the advantage of being lighter by comparison with those obtained from compositions based on PPA or MXD·6.

Conversely, as in the case of PPA or MXD·6, a high mold temperature (typically of the order of 120° C.) is necessary in the course of its shaping by injection molding, in order to ensure maximum crystallization of the product and hence to impart optimum dimensional stability and optimum mechanical properties.

For the purpose of enhancing the molding conditions of a composition based on MXD·10, particularly by lowering the time of the cooling step in the course of shaping by injection molding, document EP 0 272 503 A1 proposes adding, to a composition comprising 100 parts by weight of polyamide MXD·10, from 1 to 20 parts by weight of a crystalline polyamide having a melting temperature greater by around 20 to 30° C. than that of MXD·10.

The crystalline polyamide thus acts as a nucleating agent, in the absence of any other, inorganic filler-type nucleating agent, such as the aforementioned talc.

Although it is in fact indicated, in some of the examples illustrating the invention described in document EP 0 272 503 A1, that the injection molding step can be carried out in a mold heated at temperatures of 70° C., 100° C., and 130° C., it is nevertheless observed that the compositions described therein exhibit the best molding conditions, more particularly a rapid cycle, for a mold temperature of 130° C.

SUMMARY OF THE INVENTION

The objective of the present invention is therefore to remedy all of the aforementioned disadvantages and to provide a composition which produces a material or article possessing excellent mechanical properties, and particularly a modulus of the order of 3 GPa, this composition further having at the same time:
  a conversion temperature lower than that of PPA and MXD·6, being of the order of the conversion temperature of MXD·10, in other words advantageously between 210° C. and 260° C.,
  a mold temperature, particularly for shaping by an injection molding method, which is compatible with water as a heat-transfer fluid, and is therefore typically less than 100° C. and preferably less than 90° C.

The present invention accordingly provides a composition based on polyamide of the aforementioned type, in other words a composition comprising at least one first polyamide and at least one second polyamide, the first polyamide conforming to the formula MXD·10 or MXD·10/Z and having a melting temperature $Tf_1$, Z being selected from a unit obtained from an amino acid, a unit obtained from a lactam, and a unit conforming to the formula (Ca diamine)·(Cb diacid), with a representing the number of carbons in the diamine and b representing the number of carbons in the diacid, and at least one second polyamide.

DETAILED DESCRIPTION OF THE PREFERRED EMBODIMENT

According to the invention, said at least second polyamide has a melting temperature $Tf_2$ such that $Tf_1-40°\ C.\leq Tf_2<Tf_1+20°\ C.$ This second polyamide in the sense of the invention, which has a melting temperature $Tf_2$, is a semicrystalline polyamide, in contrast to an amorphous polyamide, which has no melting temperature.

The inventors have observed that the addition of this second polyamide having a $Tf_2$ as indicated above produces a material or article, from the composition, which has high mechanical properties (high modulus), the composition further exhibiting a conversion temperature which is compatible with the introduction of one or more reinforcements and/or additives which break down at the conversion temperatures of PPA or MXD·6.

Furthermore, and surprisingly, they observed that the mechanical properties (tensile modulus) of the material or article obtained from the composition according to the invention depend very little on the mold temperature selected, particularly during a step of shaping by injection molding, by virtue of enhanced crystallization of the MXD·10 or MXD·10/Z. The composition according to the invention therefore offers the advantage of being able to be shaped using any type of molds, whether those regulated by water or those regulated by oil as the heat-transfer fluid. In particular, it is possible to contemplate a step of shaping by injection molding at mold temperatures lower than those known from the prior art, and especially lower than 100° C., and advantageously lower than 90° C.

Reference may be made in particular to the example described hereinafter, which shows that mold temperatures of 90° C., or even of the order of 35° C., can be effectively contemplated. It is also specified that there is nothing to prevent contemplating mold temperatures greater than 100° C., such as those commonly used with PPA or MXD·6.

By comparison with the compositions based on PPA or MXD·6, the composition according to the invention is less energy-consuming, the conversion temperature and the temperature of the molds being lower.

According to one advantageous version of the invention, the melting temperature $Tf_2$ is such that $Tf_1-30°\ C.\leq Tf_2\leq Tf_1+10°\ C.$ It is specified that, in the context of the present invention, the first and second polyamides are separate polyamides.

The composition according to the invention may comprise only the two—first and second—polyamides.

It may also comprise the two first and second polyamides and at least one other polyamide conforming to the definition of the first polyamide and/or to the definition of the second polyamide.

The first polyamide of the composition according to the invention conforms to the formula MXD·10/Z and may comprise two separate repeat units, (MXD·10) on the one hand and Z on the other hand, when Z is other than 0.

The proportion of Z in the formula MXD·10/Z may be between 0% and 10 mol % (end points included), and advantageously between 0% and 5 mol % (end points included).

It is further specified here that, unless indicated otherwise, the expression "between" as used in the remainder of this description should be understood as including the stated end points.

In the formula MXD·10/Z, Z corresponds to a unit selected from a unit obtained from an amino acid, a unit obtained from a lactam, and a unit conforming to the formula (Ca diamine)·(Cb diacid), where a represents the number of carbons in the diamine and b represents the number of carbons in the diacid.

Said polyamide results from the polycondensation
 of meta-xylylenediamine (also called MXD or 1,3-xylylenediamine) or of a mixture of MXD and para-xylylenediamine (also called PXD or 1,4-xylylenediamine), the MXD forming the major part of the mixture,
 of sebacic acid, which is a linear aliphatic C10 diacid, and
 of an alpha,omega-aminocarboxylic acid, of a lactam or of a Ca diamine and of a Cb diacid, when Z is present.

Where Z=0, the first polyamide is a homopolyamide which conforms to the formula MXD·10.

The first polyamide of formula MXD·10, which results, accordingly, from the polycondensation of MXD (or of a mixture of MXD and PXD, as indicated above) and sebacic acid, corresponds to one particularly advantageous version of the invention.

When Z is present, the first polyamide is a copolyamide.

There is nothing, however, to prevent contemplating a first polyamide having three, or even more, different repeat units in pairs.

When Z represents an alpha-omega-aminocarboxylic acid, the acid may be selected, for example, from 9-aminononanoic acid (Z=9), 10-aminodecanoic acid (Z=10), 12-aminododecanoic acid (Z=12), and 11-aminoundecanoic acid (Z=11) and derivatives thereof, especially N-heptyl-11-aminoundecanoic acid.

When Z represents a lactam, it may be selected in particular from caprolactam (Z=6) and lauryllactam (Z=12).

When Z is a unit conforming to the formula (Ca diamine)·(Cb diacid), the Ca diamine may be a linear or branched aliphatic diamine, a cycloaliphatic diamine or else an aromatic diamine. The Cb diacid may be a linear or branched aliphatic dicarboxylic acid, a cycloaliphatic diacid or else an aromatic diacid.

It is specified that "a" represents the number of carbons in the Ca diamine and "b" represents the number of carbons in the Cb dicarboxylic acid. a and b are preferably each between 6 and 36 carbon atoms.

It is recalled that the composition according to the invention may comprise one or more first polyamides conforming to the formula MXD·10 and/or MXD·10/Z.

The second polyamide of the composition according to the invention is such that it has a melting temperature $Tf_2$ which conforms to the following inequation:

$$Tf_1-40°\ C.\leq Tf_2<Tf_1+20°\ C.$$

According to one advantageous version of the invention, the melting temperature $Tf_2$ is such that $Tf_1-30°\ C.\leq Tf_2\leq Tf_1+10°\ C.$ The inventors have observed that the introduction of this second polyamide allows particularly effective control over the crystallization of the composition based on polyamide MXD·10 or MXD·10/Z.

This result is particularly surprising since, although it is well known from the prior art to introduce one or more nucleating agents in order to initiate the crystallization of a polyamide(s)-based composition, the second polyamide used does not conform to the definition of the nucleating agents conventionally used to enhance the crystallization of such a composition: it is neither a nucleating agent of mineral origin nor a crystalline polyamide as taught in document EP 0 272 503 A1, which describes the use of a polyamide having a melting temperature greater by at least 20 to 30° C. than that of MXD·10.

In the example to be described hereinbelow, it has even been found that a composition according to the invention crystallized much more effectively in the presence of the second polyamide as defined in the context of the present invention than did a similar composition in which the second polyamide is a crystalline polyamide (PA6.10) having a melting temperature of 220° C., in other words greater by more than 20° C. relative to the melting temperature of approximately 193° C. of MXD·10.

In one advantageous version of the invention, this second polyamide is selected from PA11, PA12, PA10.10, and PA10.12.

It is of course possible to contemplate the use of two, or more, second polyamides each having a melting temperature $Tf_2$ such that $Tf_1 - 40°\ C. \leq Tf_2 < Tf_1 + 20°\ C.$, where $Tf_1$ is the melting temperature of the first polyamide MXD·10 or MXD·10/Z.

With more particular preference the second polyamide is PA11.

The composition according to the invention comprises said at least second polyamide in a proportion by weight of between 0.1% to 20%, and advantageously between 1% to 10%, relative to the total weight of the first and second polyamides.

The first and/or second polyamides of the composition may be wholly or partly biobased—that is, may comprise organic carbon obtained from biomass and determined in accordance with standard ASTF D6866. In such a case, the composition according to the invention may be considered to be itself partly biobased, this having an advantage relative to compositions based on polyamide(s) obtained from fossil raw materials.

In particular, the sebacic acid of the unit MXD·10 and/or the unit Z may be biobased. Similarly, the second polyamide may be biobased, as in the specific case in which the second polyamide is PA11, a polyamide originating from castor oil.

According to one advantageous version of the invention, the composition may further comprise reinforcements.

The addition of reinforcements to the composition of the invention makes it possible to reinforce some of the mechanical properties, particularly the modulus, of the material obtained from this composition. The nature and amount of reinforcements are adapted to the target value for the modulus, which may thus attain values which are very markedly more than 3 GPa, being, for example, of the order of 20 GPa in the case of glass fibers.

By reinforcements are meant beads, long or short fibers, woven or non-woven continuous fibers, a woven or non-woven mat, or else ground materials, flours, which allow the modulus to be increased when they are combined with polymeric matrices.

The reinforcements may be selected, for example, from glass beads, fibers, which may be glass fibers, carbon fibers, polymeric fibers, natural fibers (for example, vegetable or animal fibers), and mixtures thereof.

Advantageously it will be possible for the reinforcements to be biobased, in other words to comprise organic carbon obtained from biomass and determined in accordance with standard ASTF D6866.

The biobased reinforcements which may be used in the context of the present invention are as follows:
  plant fibers, comprising fibers originating from the seminal hairs of seeds (cotton, kapok), bast fibers extracted from plant stems (flax, hemp, jute, ramie, etc), hard fibers extracted from leaves (sisal, abaca, etc.), from trunks (Manilla hemp, wood in general), from husks of fruits (coconut, etc.),
  animal fibers which originate from hairs, such as animal fleece, and secretions such as silk,
  carbon fibers or carbon nanotubes obtained from biobased raw materials,
  polymeric fibers obtained from biobased raw materials,
  ground materials from barks, peels or pips (hazelnuts, nuts, etc.), from animal carapaces (crabs, etc.), from grains (rice, etc.).

It is pointed out that the conversion temperature of the composition according to the invention allows a greater selection of reinforcements, of certain plant fibers, for example, and that this is of real economic and technical advantage, particularly because the material or article obtained from a composition comprising such plant fibers has the advantage of being lighter than that obtained from a composition comprising certain other reinforcements, owing to the lower density of these plant fibers by comparison with that of these other reinforcements.

In one particular variant of the invention, the reinforcements are advantageously fibers, preferably glass fibers and/or carbon fibers.

The proportion by weight of said reinforcements is preferably between 0% to 70%, advantageously between 15% and 65%, and more preferably between 20% and 60%, relative to the total weight of the composition according to the invention.

According to another advantageous version of the invention, the composition may further comprise at least one additive commonly used in polyamide-based compositions.

The selection of such additives is wider than for the compositions based on PPA or MXD·6, owing to the lowering of the conversion temperature of the composition according to the invention.

Advantageously, it will be possible for the additive or additives to be biobased, in other words to comprise organic carbon obtained from biomass and determined in accordance with the standard ASTF D6866.

The amount and nature of this or these additive(s) which may be introduced into the compositions of the invention will be dependent, of course, on the desired effect or effects.

Without limitation, mention may be made of at least one additive selected from fillers, dyes, stabilizers, especially UV stabilizers, plasticizers, impact modifiers, surfactants, nucleating agents, pigments, brighteners, antioxidants, lubricants, flame retardants, natural waxes, and mixtures thereof.

The fillers include silica, kaolin, magnesia, slags and/or titanium oxide.

Mention may also be made of conductive fillers such as carbon black, graphite or else carbon nanotubes. Fillers of this kind allow the composition of the invention, and therefore the material to be obtained from said composition, to be endowed with antistatic properties.

The additives also include nucleating agents known to the skilled person, such as talc, for example. Although not indispensable for allowing crystallization of the composition according to the invention, they may nevertheless be introduced into said composition.

Advantageously, the proportion by weight of said nucleating agent or agents is between 0% to 5%, and advantageously between 0.3% and 4%, relative to the total weight of the composition according to the invention.

The composition may further comprise one or more flame retardants such as, for example, $Mg(OH)_2$, melamine pyrophosphates, melamine cyanurates, ammonium polyphosphates, metal salts of phosphinic acid or diphosphinic acid, or else polymers containing at least one metal salt of phosphinic acid or diphosphinic acid.

The salt may be selected, for example, from aluminum methylethylphosphinate and aluminum diethylphosphinate. Mixtures containing such metal salts are sold by Clariant under the trade name Exolit OP1311, OP1312, OP1230 and OP1314.

It is specified that the conversion temperature of the composition according to the invention allows a wider selection of flame retardants, and this is of real economic and technical advantage.

The proportion by weight of the flame retardant or retardants is preferably between 0% and 35%, advantageously between 10% and 30%, and preferably between 15% and 25%, relative to the total weight of the composition according to the invention.

A composition which is advantageous in the sense of the invention may comprise the following proportions by weight of the various compounds below:
- from 10% to 100% of a first polyamide MXD·10/Z, preferably of MXD·10, and of a second polyamide, preferably PA11, the proportion by weight of the second polyamide representing from 0.1% to 20% of the first and second polyamides,
- from 0% to 70% of carbon and/or glass fibers,
- from 0% to 5% of a nucleating agent, such as talc,
- from 0% to 35% of a flame retardant.

The composition according to the invention may be used to produce a structure.

This structure may be a monolayer structure, when formed only of the composition according to the invention.

This structure may also be a multilayer structure, when it comprises at least two layers and when at least one of the different layers forming the structure is formed of the composition according to the invention.

The structure, whether monolayer or multilayer, may take the form in particular of fibers, a film, a tube, a hollow body or an injection molding. The invention is particularly appropriate to the production of an item or article obtained by an injection molding process.

The invention likewise provides a process for preparing a composition of the invention as defined above.

According to the invention, the composition may be prepared by any method which allows homogeneous mixing of the polymers and any additives and/or other reinforcements forming part of the composition according to the invention.

These methods include, in particular, extrusion in the melt state, compacting or else roll milling.

More particularly, the composition according to the invention is prepared by mixing in the melt state of all of the polymers and any additives and fibers, and is then converted, in the form of granules, for example, by compounding on an apparatus known to the skilled person, such as a twin-screw extruder, a co-grinder or a mixer.

The composition according to the invention, obtained by the preparation process described above, may be subsequently converted for use or a subsequent transformation as known to the skilled person, particularly by means of devices such as an injection press or an extruder.

The composition according to the invention may also be introduced into a twin-screw extruder which, in the absence of an intermediate pelletizing step, supplies an injection press or an extruder in accordance with an implementation device known to the skilled person.

The invention is directed in particular to a method of shaping an article obtained from the composition as defined above, said method comprising a step of injection molding.

An article of this kind may be obtained by injection, by extrusion, by co-extrusion or by multiple injection, starting from at least one composition as defined above.

The invention provides, lastly, an article obtained from the composition of the invention, and also the use of said article.

Such an article may advantageously be used in the automotive or construction fields or in the household, electrical, electronics, medical or sports segments.

Given that the composition according to the invention has a lower density than compositions based on PPA or MXD·6, an article obtained from such a composition is lighter for the same volume.

The composition according to the invention may advantageously be contemplated for the production of all or part of elements of electrical and electronic goods, such as encapsulated solenoids, pumps, telephones, computers, printers, photocopiers, modems, monitors, remote control units, cameras, circuit breakers, sheaths of electrical cables, optical fibers, switches, and multimedia systems. These elements of electrical and electronic goods cover not only the structural parts of such goods (casings, housings, etc.) but also their possible associated accessories (earpieces, connecting elements, cables, etc.).

The composition may also be used for producing all or part of automotive equipment such as tube connectors, pumps, underhood injection moldings, injection moldings in the form of bumpers, floorboards, and door trim.

The composition may also be used for producing all or parts of medical or surgical equipment, of packaging or else of sports or leisure articles, such as cycle equipment (saddle, pedals), or to form rigid elements of footwear, for example.

The composition may further be used for producing all or part of elements of household equipment (air conditioner) or kitchen electricals (coffee maker, oven, washing machine, dishwasher).

The present invention will now be described in the examples below, such examples being given solely by way of illustration, and obviously without limitation.

Third Part

Preparation of Compositions 1.1 to 1.5, 2.1 to 2.6, and 3

The compositions were prepared from the following products:
- PA MXD·10: homopolyamide obtained by polycondensation of 1,3-xylylenediamine and decanedioic acid (sebacic acid), comprising 57% of biobased carbon (Arkema) and having a melting temperature of 193° C.
- PA 11: homopolyamide obtained by polycondensation of 11-aminoundecanedioic acid, containing 100% of biobased carbon (Arkema) and having a melting temperature of 185° C.
- PA 6.10: homopolyamide obtained by polycondensation of hexanediamine and decanedioic acid (Arkema) and having a melting temperature of 220° C.
- Steamic OOS DG Talc: nucleating agent (Luzenac)
- Glass fibers: reinforcement sold as CT FT 692 (ASAHI)

Irganox 1010: antioxidant (CIBA)
Calcium stearate and Wax E: lubricant/mold release agent (BASF and CECA, respectively)

In a first part of the study, compositions containing no glass fibers are prepared by mixing the various constituents (compounding) using a Haake co-rotating twin-screw extruder, at a setpoint temperature of 260° C.

The various constituents of these compositions, in the respective proportions by weight as reported in table 1, are introduced via the feed hopper in the 1st barrel.

TABLE 1

| | Composition | | | | |
|---|---|---|---|---|---|
| | 1.1 comp. | 1.2 comp. | 1.3 comp. | 1.4 inv. | 1.5 inv. |
| PA MXD.10 | 100 | 89.6 | 98.6 | 89.6 | 88.6 |
| PA 6.10 | — | 10 | — | — | — |
| Talc | — | — | 1 | — | 1 |
| PA 11 | — | — | — | 10 | 10 |
| IRGANOX 1010 | — | 0.4 | 0.4 | 0.4 | 0.4 |

Compositions 1.1, 1.2, and 1.3 are comparative (comp.) compositions, whereas compositions 1.4 and 1.5 are compositions in accordance with the invention (inv.). In particular, composition 1.2 comp. is in accordance with the composition taught by document EP 0 272 503 A1.

In a second part of the study, compositions containing glass fibers are prepared by mixing the various constituents (compounding) using an MC26 co-rotating twin-screw extruder, at a setpoint temperature of 260° C.

The various constituents of these compositions, in the respective proportions by weight as reported in table 2, are introduced via the feed hopper at the 1st barrel, with the exception of the glass fibers, which are introduced in a side feed.

TABLE 2

| | Composition | | | | | |
|---|---|---|---|---|---|---|
| | 2.1 comp. | 2.2 comp. | 2.3 comp. | 2.4 inv. | 2.5 comp. | 2.6 inv. |
| PA MXD.10 | 49.4 | 49 | 44.08 | 44.08 | 43.59 | 43.59 |
| PA 6.10 | — | — | 4.92 | — | 4.92 | — |
| Talc | — | — | — | — | 0.49 | 0.49 |
| PA 11 | — | — | — | 4.92 | — | 4.92 |
| Glass fibers | 50 | 50 | 50 | 50 | 50 | 50 |
| Wax E | 0.3 | 0.3 | 0.3 | 0.3 | 0.3 | 0.3 |
| Calcium stearate | 0.3 | 0.3 | 0.3 | 0.3 | 0.3 | 0.3 |
| Irganox 1010 | — | 0.4 | 0.4 | 0.4 | 0.4 | 0.4 |

Compositions 2.1 to 2.3 and 2.5 are comparative (comp.) compositions, whereas compositions 2.4 and 2.6 are compositions in accordance with the invention (inv.). In particular, composition 2.3 comp. is in accordance with a composition taught by document EP 0 272 503 A1.

In a third part of the study, a composition 3 in accordance with the invention and containing glass fibers is prepared by mixing (compounding) using a Werner 40 co-rotating twin-screw extruder, at a conversion temperature of 260° C.

The various constituents of this composition, in the respective proportions by weight as reported in table 3, are introduced via the feed hopper at the 1st barrel, with the exception of the glass fibers, which are introduced as a side feed.

It will be noted that the various constituents of composition 3 are the same as those of composition 2.6 featuring in table 2.

TABLE 3

| | Composition 3 inv. |
|---|---|
| PA MXD.10 | 43.59 |
| PA 11 | 4.92 |
| Glass fibers | 50 |
| Irganox 1010 | 0.4 |
| Wax E | 0.3 |
| Calcium stearate | 0.3 |
| Steamic OOS DG talc | 0.49 |

Injection of Compositions 1.1 to 1.5, 2.1 to 2.6, and 3

With the exception of the mold temperature, which is variable, the various compositions 1.1 to 1.5, 2.1 to 2.6, and 3 are subsequently injected under the following conditions:
die feed temperature: 240/260° C.
mold temperature: 35° C. or 90° C. or 130° C.
Flow rate: 27 cm$^3$/s
Cycle time: 60 s (corresponding to a hold time of 20 s and a cooling time of 40 s)

Characterization of the Materials

—A— Study of the Crystallization of Compositions 1.1 to 1.5 by DSC Analysis:

80×10×4 mm$^3$ bars are prepared from compositions 1.1 to 1.5 by injection in a mold at 90° C. with water as heat-transfer fluid. A sample is taken of these bars for DSC analysis. The analytical protocol used is as follows:
temperature equilibration at 20° C.,
1st heating to 280° C. at a heating rate of 20° C./min.

During the 1st heating, the energy supplied to the system causes crystallization of the part of the composition that has not crystallized during the conversion step, in this case injection. The enthalpy of crystallization measured at this point (J/g) allows the phenomenon to be quantified.

Subsequently, at the melting temperature, the composition is melted-specifically, the part of the composition which crystallized during the injection step and the part of the composition which crystallized during the 1st heating are melted. The enthalpy of fusion measured at this point (J/g) allows the phenomenon to be quantified.

The enthalpy of crystallization (measured during the 1st heating of the DSC analysis)/enthalpy of fusion (measured during the 1st heating of the DSC analysis) ratio allows quantification of the capacity of the system to crystallize readily during the step of conversion by injection.

The lower this ratio, the more readily the system crystallizes during the conversion step, this being the desired objective in the context of the present invention.

The results of the DSC analyses are reported in table 4 below.

TABLE 4

| | Composition | | | | |
|---|---|---|---|---|---|
| | 1.1 comp. | 1.2 comp. | 1.3 comp. | 1.4 inv. | 1.5 inv. |
| Enthalpy of crystallization (J/g) | 35.3 | 33.8 | 21.8 | 11.3 | 8.3 |
| Enthalpy of fusion (J/g) | 39.2 | 39.0 | 40.5 | 41.9 | 40.8 |
| Enthalpy of crystallization/enthalpy of fusion ratio | 0.90 | 0.87 | 0.54 | 0.27 | 0.20 |

It is seen that compositions 1.4 and 1.5 according to the invention have an enthalpy of crystallization/enthalpy of fusion ratio which is lower than that of comparative compositions 1.1, 1.2, and 1.3. This means that compositions 1.4 and 1.5 according to the invention crystallize more readily than the comparative compositions 1.1, 1.2, and 1.3 during the step of conversion by injection.

More particularly, comparing the ratios obtained for compositions 1.2 and 1.4, it is observed that PA11, which has a melting temperature of 185° C., has a greater nucleating power than PA6.10 with a melting temperature of 220° C. This observation goes against the teaching of document EP 0 275 503 A1, which advised introducing a crystalline polyamide having a melting temperature at least 20° C. greater than that of MXD·10.

Comparing, moreover, the ratios obtained for compositions 1.3 and 1.4, it is observed that PA11 also has a greater nucleating power than talc. It will be noted, lastly, that composition 1.5, comprising both PA11 and talc, gives the best value for enthalpy of crystallization/enthalpy of fusion ratio.

—B— Study of the Crystallization of Compositions 2.1 to 2.6 by DSC Analysis:

Tensile test specimens 2 mm in thickness were injection-molded from compositions 2.1 to 2.6 in accordance with the protocol of standard ISO 527 1 BA, in a mold at 95° C., the "cycle time", the time allowing said test specimens to be obtained, being 15 s.

Samples were then taken for DSC analysis. The analytical protocol used is the same as that described above for the DSC analysis of the bars formed from compositions 1.1 to 1.5.

The results of the DSC analyses are reported in table 5 below.

TABLE 5

|  | Composition | | | | | |
| --- | --- | --- | --- | --- | --- | --- |
|  | 2.1 comp. | 2.2 comp. | 2.3 comp. | 2.4 inv. | 2.5 comp. | 2.6 inv. |
| Enthalpy of crystallization (J/g) | 16.4 | 17.8 | 13.4 | 7.6 | 9.0 | 4.3 |
| Enthalpy of fusion (J/g) | 25.6 | 24.7 | 25 | 23.5 | 24.6 | 21.8 |
| Enthalpy of crystallization/ enthalpy of fusion ratio | 0.64 | 0.72 | 0.54 | 0.32 | 0.37 | 0.20 |

Here again it is found that compositions 2.4 and 2.6 according to the invention have an enthalpy of crystallization/enthalpy of fusion ratio
- which is lower than comparative compositions 2.1 and 2.2, which do not contain a second polyamide, and
- which is also lower than the respective comparative compositions 2.3 and 2.5, which comprise PA6.10 as second polyamide, and, where appropriate, talc.

Compositions 2.4 and 2.6 according to the invention crystallize more readily than comparative compositions 2.1, 2.2, 2.3, and 2.5 during the injection molding step.

Comparing the ratios obtained for compositions 2.3 and 2.4, it is noted that the nucleating power of PA11 still remains much higher than that of PA6.10, even in the presence of glass fibers.

This observation remains true even when talc is added as a nucleating agent to the compositions; indeed, the ratio obtained for composition 2.6 according to the invention is lower than that for comparative composition 2.5.

It will be noted, lastly, that composition 2.6, comprising both PA11 and talc, gives the best enthalpy of crystallization/enthalpy of fusion ratio value.

—C— Study of Mechanical Properties on Composition 3:

Tensile Modulus:

Tensile test specimens 4 mm in thickness are prepared from composition 3 by injection in a mold at different temperatures (35° C., 90° C., and 130° C.), in accordance with the protocol of standard ISO 527 1A, the "cycle time"—the time allowing said test specimens to be obtained—being 40 s.

These test specimens are tested dry without conditioning or else are conditioned for 15 days in a controlled aTfosphere (at 23° C. and 50% relative humidity).

These test specimens are evaluated in accordance with said standard ISO 527. Accordingly, the tensile modulus is measured (GPa).

Charpy Impact:

80×10×4 mm³ bars are prepared from composition 3 by injection in a mold at different temperatures (35° C., 90° C., and 130° C.).

These bars are evaluated dry without conditioning or else are conditioned for 15 days in a controlled aTfosphere (at 23° and 50% relative humidity).

They are tested in the Charpy pendulum impact test in accordance with standard ISO 179-1eU, with a pendulum of 7.5 joules. Hence a measurement is made of the energy absorbed by the bars, expressed in kJ/m².

Reported in tables 6 and 7 below are the results of the measurements of tensile modulus and Charpy impact, as a function of the injection-mold temperature. Table 6 reports measurements made on the test specimens and bars tested under dry conditions, without conditioning. Table 7 reports measurements made on test specimens and bars tested after conditioning for 15 days in a controlled atmosphere (at 23° C. and 50% relative humidity).

TABLE 6

|  |  | Composition 3 Temperature of injection mold | | |
| --- | --- | --- | --- | --- |
|  |  | 35° C. | 90° C. | 130° C. |
| Tensile modulus (GPa) | dry | 20 | 22 | 22 |
| Notched Charpy impact at 23° C. (kJ/m²) | dry | 10 | 10 | 9.5 |

TABLE 7

|  |  | Composition 3 Temperature of injection mold | | |
| --- | --- | --- | --- | --- |
|  |  | 35° C. | 90° C. | 130° C. |
| Tensile modulus (GPa) | conditioned | 20 | 22 | 22 |
| Notched Charpy impact at 23° C. (kJ/m²) | conditioned | 10 | 10 | 9.5 |

It is noted that composition 3 according to the invention possesses mechanical properties which are similar and optimum, irrespective of the temperature of the injection mold used and the conditioning.

The compositions of the invention therefore offer the advantage of being able to use molds regulated either by oil or by water.

What is claimed is:

1. A composition comprising only one polyamide mixture consisting of:
   (i) a first polyamide represented by the formula MXD·10, resulting from a condensation of:
      (a) meta-xylylenediamine (MXD) or a mixture consisting of MXD and para-xylylenediamine (PXD), wherein the MXD is predominant in the mixture of MXD and para-xylylenediamine (PXD), with
      (b) sebacic acid; and
   (ii) a second polyamide, wherein said second polyamide is PA11,
   wherein said first polyamide is present in the composition in a proportion by weight of 43.59 to 98.6 wt %,
   wherein said second polyamide is present in a proportion by weight of between 5% and 20% with respect to total weight of the first and second polyamides in the composition,
   wherein the composition further comprises reinforcements comprising glass beads, glass fibers, polymeric fibers, natural fibers, ground materials, plant fibers or any combination thereof,
   wherein the composition optionally further comprises at least one additive selected from the group consisting of fillers, dyes, stabilizers, plasticizers, impact modifiers, surfactants, nucleating agents, pigments, brighteners, antioxidants, lubricants, flame retardants, natural waxes, and mixtures thereof, and
   wherein the composition does not contain carbon fibers.

2. The composition of claim 1, wherein the composition comprises said reinforcements in a proportion by weight of between 0% (excluded) to 56%, relative to total weight of the composition.

3. The composition of claim 1, characterized in that the composition comprises the nucleating agent or agents in a proportion by weight of between 0% (excluded) to 5%, relative to total weight of the composition.

4. The composition of claim 1, characterized in that the composition comprises the flame retardant or retardants in a proportion by weight of between 0% (excluded) to 35%, relative to total weight of the composition.

5. A monolayer structure or at least one layer of a multilayer structure, comprising the composition of claim 1.

6. The structure of claim 5, characterized in that a form of the structure is a fiber, a film, a tube, a hollow body or an injection molding.

7. An article obtained from the composition of claim 1.

8. An automotive, construction, household, electrical, electronics, medical or sports product, comprising the article of claim 7.

9. The article of claim 7, wherein the article has been shaped by injection molding at mold temperatures lower than 90° C.

10. The composition according to claim 1, wherein the at least one second polyamide is present in a proportion by weight of between 10% to 20% with respect to total weight of the first and second polyamides in the composition.

11. The composition according to claim 1, wherein the composition does not contain carbon nanotubes and graphite.

* * * * *